(12) United States Patent
Rodriquez et al.

(10) Patent No.: US 11,667,159 B2
(45) Date of Patent: Jun. 6, 2023

(54) TREAD FOR A PNEUMATIC TIRE AND A PNEUMATIC TIRE

(71) Applicant: BRIDGESTONE EUROPE NV/SA, Zaventem (BE)

(72) Inventors: Giuseppe Rodriquez, Rome (IT); Beatrice Mellara, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 297 days.

(21) Appl. No.: 17/042,050

(22) PCT Filed: Mar. 25, 2019

(86) PCT No.: PCT/IB2019/052387
§ 371 (c)(1),
(2) Date: Sep. 25, 2020

(87) PCT Pub. No.: WO2019/186353
PCT Pub. Date: Oct. 3, 2019

(65) Prior Publication Data
US 2021/0188012 A1  Jun. 24, 2021

(30) Foreign Application Priority Data
Mar. 27, 2018  (IT) .................. 102018000003994

(51) Int. Cl.
*B60C 11/12*  (2006.01)
(52) U.S. Cl.
CPC ...... *B60C 11/1218* (2013.01); *B60C 11/1222* (2013.01); *B60C 11/1263* (2013.01); *B60C 11/1281* (2013.01); *B60C 2011/1209* (2013.01)
(58) Field of Classification Search
CPC ............. B60C 11/1218; B60C 11/1222; B60C 11/1281; B60C 2011/1209
See application file for complete search history.

(56) References Cited

U.S. PATENT DOCUMENTS

| | | | |
|---|---|---|---|
| 6,315,018 | B1 | 11/2001 | Watanabe |
| 2011/0315289 | A1 | 12/2011 | Ohashi |

(Continued)

FOREIGN PATENT DOCUMENTS

| | | |
|---|---|---|
| DE | 10 2011 055 913 | 1/2011 |
| EP | 0 917 970 | 5/1999 |

(Continued)

OTHER PUBLICATIONS

Machine translation for Japan 2014-097697 (Year: 2022).*

(Continued)

*Primary Examiner* — Steven D Maki
(74) *Attorney, Agent, or Firm* — Foley & Lardner LLP

(57) ABSTRACT

Tread for a pneumatic tyre comprising a sipe having a sipe extension (L) and a sipe depth (P) along a direction of wear (U), wherein said sipe has at least two sections (S1, S2) along said direction of wear (U) having respective differentiated conformations, such that an intersection profile (P1, P2) between the sipe and a surface (T1, T2) parallel to the contact surface of the tread is different for each of said at least two sections (S1, S2), wherein at least one surface section (S1) of said at least two sections (S1, S2) has a depth (PS) that is variable along said sipe extension (L), said two sections (S1, S2) being connected by a transition section (S3) defining a transition line (TL) between the respective sections (S1, S2), said variable depth (PS) of said surface section, presenting a maximum depth (PSMAX) and a minimum depth (PSMIN), and wherein the surface section (SI) has a twisted configuration.

9 Claims, 11 Drawing Sheets

(56) References Cited

U.S. PATENT DOCUMENTS

2017/0166015 A1\* 6/2017 Christen ............ B60C 11/1218
2018/0326794 A1\* 11/2018 Collett ............... B60C 11/0323

FOREIGN PATENT DOCUMENTS

| EP | 1 859 962 | | 11/2007 |
|----|-----------|---|---------|
| JP | 2014-097697 A | \* | 5/2014 |
| KR | 10-0869025 | | 11/2008 |
| KR | 101037410 B1 | \* | 5/2011 |
| TW | 2016-00366 A | \* | 1/2016 |
| TW | 201600366 | | 1/2016 |
| WO | WO-2014/132196 | | 9/2014 |

OTHER PUBLICATIONS

Machine translation for Taiwan 2016-00366 (Year: 2022).\*
Machine translation for Korea 101037410 (Year: 2022).\*
International Search Report and Written Opinion for PCT Application No. PCT/IB2019/052387, dated Jun. 13, 2019.
Office Action for CN Application No. 201980020326.1, dated Dec. 30, 2021 and English translation thereof.

\* cited by examiner

TREAD FOR A PNEUMATIC TIRE AND A PNEUMATIC TIRE

CROSS-REFERENCE TO RELATED APPLICATIONS

This application claims the benefit of and priority to International Patent Application No. PCT/IB2019/052387, filed Mar. 25, 2019, which claims priority to Italian Patent Application No. IT 201800003994, filed Mar. 27, 2018, both of the disclosures of which are incorporated herein by reference in their entirety.

TECHNICAL FIELD

The present disclosure refers to a tread for pneumatic tires. In particular, it refers to a tread that incorporates specific conformations that make it possible to easily check the state of the wear thereof thereby maintaining and/or improving the performance of the pneumatic tire on wet and/or snow-covered surfaces.

BACKGROUND

Strongly felt is the problem of being able to check the state of wear of the tread of a pneumatic tire, in a simple and effective manner, during its useful life. On the other hand, the desired result is that of obtaining such an effect without altering the technical performance of the pneumatic tire, or better still in improving it, especially under certain conditions of use including use on a wet and/or snow-covered surface.

To this end numerous proposals have been made for solutions aimed at giving an indication of the fact that the tread has reached a wear limit that is such to require the replacement of the pneumatic tire. Some of these solutions consist in causing elements, of differing natures, to emerge from the tread, elements which were originally incorporated into the material of the tread at a certain depth with respect to the surface in contact with the ground.

To date however those solutions that are known can only alert the user as to when the degree of wear is such to suggest a replacement intervention.

On the contrary there are no known solutions that can provide a quantitative, continuous indication of the level of wear during every moment of the life cycle of the pneumatic tire.

This would allow the user to be more aware of the actual state of wear of the tread, and therefore to more effectively schedule the maintenance and/or replacement of pneumatic tires. It is also important, at any moment, to be able to estimate the actual wear of the tread, insofar as it is to this that the residual life and therefore, proportionally, the number of kilometers that the pneumatic tire can still usefully travel, is compared.

Furthermore, it would be particularly useful if this wear indicator could be monitored continuously in time, thus having, at any moment, a current and realistic indication.

On the other hand, any solution aimed at resolving these issues should be combined with the technical design and construction requirements of a pneumatic tire that addresses aspects of safety and performance under differing surface conditions, etc.

For the purposes of the present disclosure, by the term "tread element" it is intended a portion of the tread pattern that is repeated, identical to itself, along the entire length of the tread.

By the term "tread component," or simply "component", it is intended any tread block, or else a rib of the tread, regardless of the form and/or positioning thereof.

By the term "contact surface" it is intended that portion of a surface of a component that, during the rolling of the pneumatic tire, comes into contact with the ground.

By the term "sipe" it is intended a thin and generally narrow groove on a tread component, obtained by the molding of the pneumatic tire, that is particularly intended to improve the performance of the pneumatic tire on wet and/or snow-covered surfaces.

EP0917970 shows a groove formed in a block and structured, in a direction at the depth of the groove, by a narrow groove portion formed on a side of the surface in contact with the ground of the groove and a wide groove portion formed on a side of a bottom portion of the groove and wider than the narrow portion.

DE102011055913 shows a pneumatic tire with tread blocks wherein each has at least one central incision, which, at the base of the incision, has a section which extends in a radial direction and that is bounded by planar sliding surfaces, wherein the proportion of the sliding surfaces in the overall sectional face of the sipe depends upon the selected pitch length ratio and is larger given a relatively large pitch length ratio, while in the other sipes of the profile block (2) the wave or zigzag shape extends up to the base of the sipe.

US2011315289 shows an incision which extends in a block of a shoulder region of the tread of a pneumatic tire and has an inner region on the side of the equator of the pneumatic tire in the direction of the length of the incision, a straight incision portion over the entire direction of the depth of the sipe.

EP1859962 shows a pneumatic tire having a tread with at least one tread element with a multidimensional groove. The groove has a width W, a depth Ds, and an effective length Le. The groove has a first radially outermost portion with a constant effective length Le, a second transition portion with a gradually increasing effective length Le, and a third radially innermost portion having a constant effective length Le that is greater than the effective length of the first portion.

SUMMARY

The technical problem addressed and solved by the present disclosure is therefore to provide a tread having a design that is such to verify, at any moment, the actual state of wear of the tread whilst maintaining the desired levels of performance under any condition of use, in particular maintaining and/or improving the performance of the pneumatic tire on wet and/or snow-covered surfaces.

This is achieved by means of a tread.

A further object of the present disclosure is a pneumatic tire.

Further characteristics of the present disclosure are defined herein.

The conformation of a tread according to the present disclosure makes it possible to optimize the rigidity of the components thereof, rendering them more pliable, particularly at the surface portion thereof (the one closest to being in contact with the road surface). This is to the benefit of performance, essentially on wet and/or snow-covered surfaces, insofar as the conformation is such to allow for a greater opening of the sipes, thereby ensuring a greater wiping effect in the wet and better entrapment of snow, respectively, without compromising the rigidity of the structural component.

BRIEF DESCRIPTION OF THE FIGURES

Other advantages, together with the characteristics and usages of the present disclosure, will become clear from the following detailed description of the preferred embodiments thereof given purely by way of non-limiting examples.

Reference will be made to the figures of the accompanying drawings, wherein.

DETAILED DESCRIPTION

Some possible embodiments of the present disclosure will be described below, making reference to the above figures.

For descriptive simplicity hereinafter reference will be made to a generic tread block. As already explained, it is however to be understood that the principle underlying the present disclosure is applicable to any tread component: block, rib or otherwise.

Figure 1:
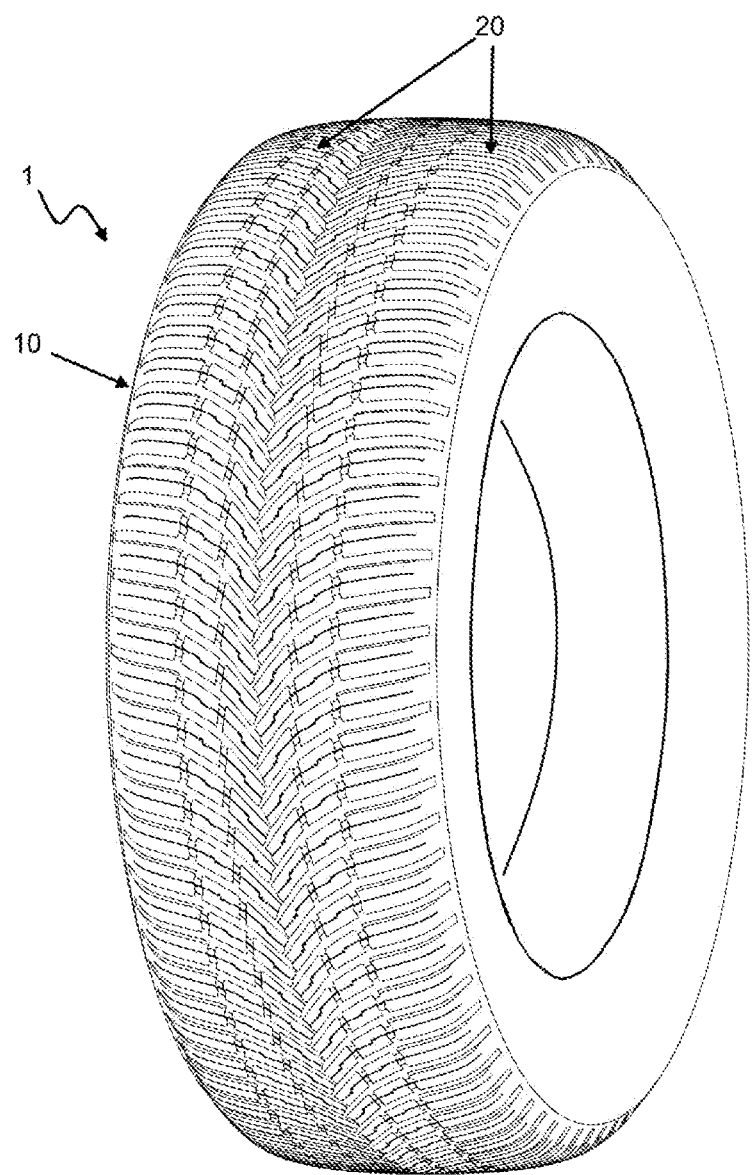
FIG. 1 shows a pneumatic tire according to the present disclosure, provided with a tread according to the present disclosure.

With initial reference to FIG. 1, this shows an exemplary perspective view of a pneumatic tire 1 according to the present disclosure, which incorporates a tread 10 according to the disclosure.

In general terms, a tread 10 for a pneumatic tire 1 comprises a plurality of tread components 20, blocks, ribs or otherwise.

Figure 2:
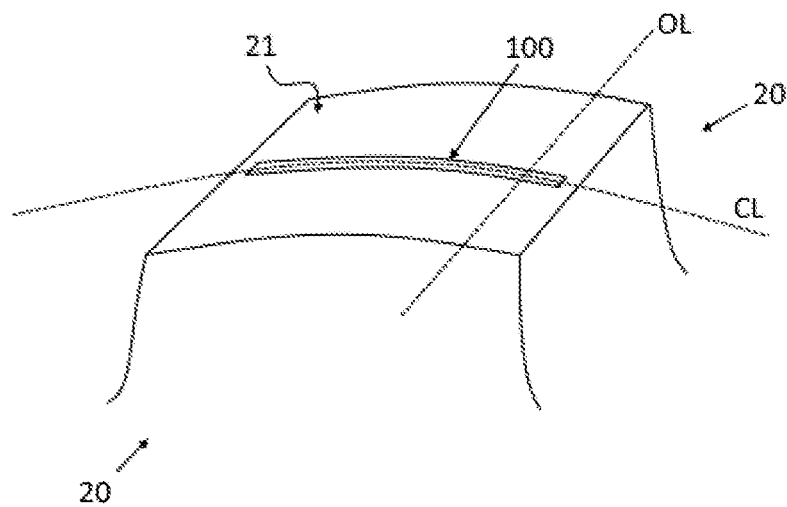
FIG. 2 is an exemplary perspective view of a pneumatic tire according to the present disclosure.

In particular, FIG. 2 shows a tread block 20 according to the present disclosure.

Each block 20 of the tread 10 has a respective contact surface 21 which, together with the tread, defines the surface of the tread that is in contact with the ground.

Figure 3:
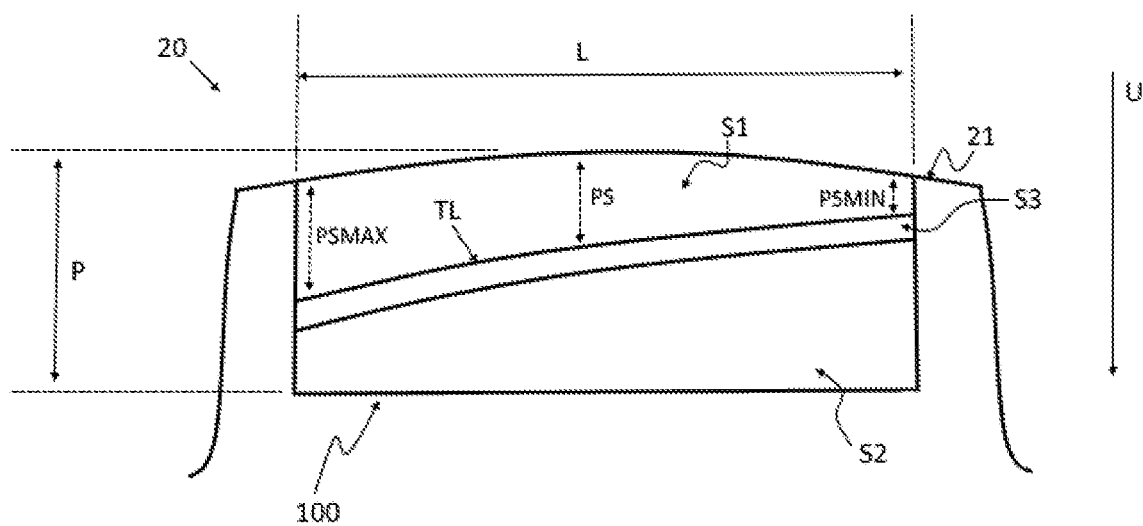
FIG. 3 is a sectional view of the block of FIG. 1, along the line CL.

According to the present disclosure, as can be seen better in FIG. 3, at least one of the blocks 20 of the tread 10 comprises a sipe 100 having a sipe extension L and a sipe depth P along a direction of wear U substantially orthogonal to said contact surface 21.

Preferably, although this should not be considered a limiting feature, the sipe extension L develops along a sipe direction that is substantially oriented according to a longitudinal extension line CL of the tread.

The sipe 100 has at least two sections S1, S2 which extend in depth along the direction of wear U. Furthermore, according to the present disclosure, at least one surface section S1 of the at least two sections S1, S2 has a depth PS that varies along the sipe extension L.

The two sections S1, S2 have, according to the present disclosure, respective differentiated conformations and are advantageously connected by a transition section S3 which defines a transition line TL between the surface section S1 and the transition section S3.

Preferably, the transition section S3 has a depth—along said sipe depth—that is negligible with respect to the depth of said surface section S1 and/or that of said depth section S2.

Advantageously, the variable depth PS—with respect to said transition line TL—is made to vary continuously between the maximum depth PSMAX and the minimum depth PSMIN along the sipe extension L. Within the context of the present disclosure, "vary continuously" means that the transition line TL does not have abrupt variations in slope, therefore, it does not have steps or progressions similar to steps. On the contrary, it has gradual variations in slope.

In particular, according to some embodiments it can be expected that the variable depth PS of the surface section S2 assumes the maximum depth PSMAX thereof and the minimum depth PSMIN thereof at respective ends of said sipe extension L.

According to the present disclosure, the sections S1, S2 have respective differentiated conformations, in the sense that the intersection profiles P1, P2 between the sipe 100 and surfaces T1, T2 parallel to the contact surface 21 of the block 20 are different for each of the two sections S1, S2.

Figure 4A:
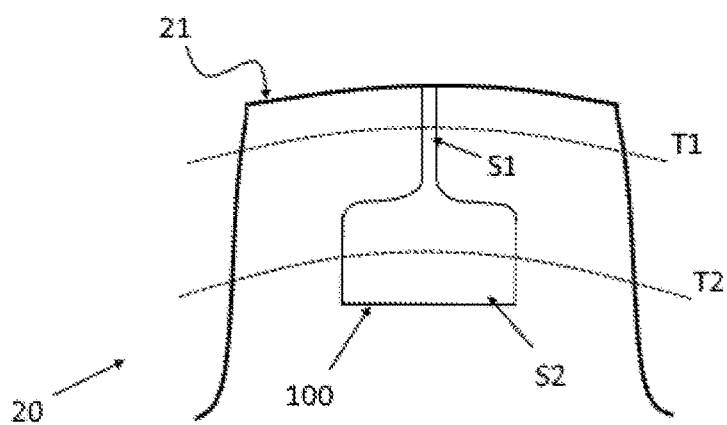
FIG. 4A shows a cross section (taken along the line OL of FIG. 2) of a tread block according to a possible embodiment of the present disclosure.
Figure 4B:
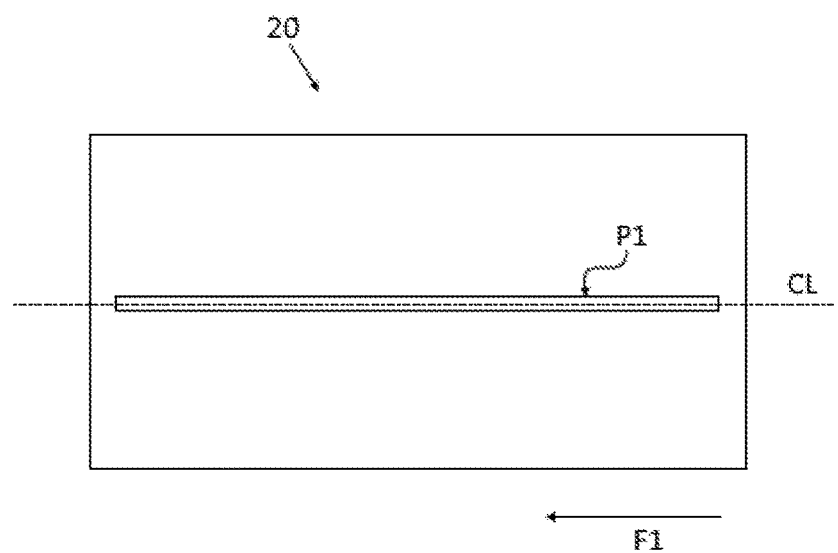
FIGS. 4B and 4C show cross sections of the block of FIG. 4A, corresponding to the surfaces T1, T2.
Figure 4C:
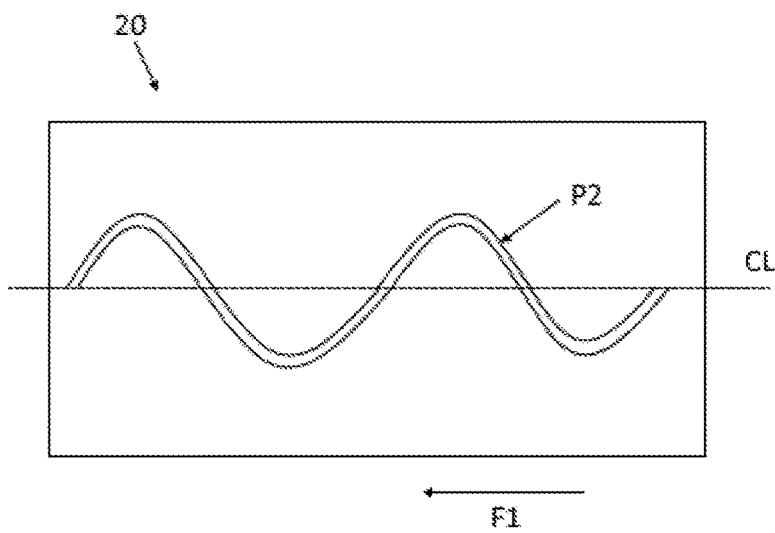
Figure 5A:
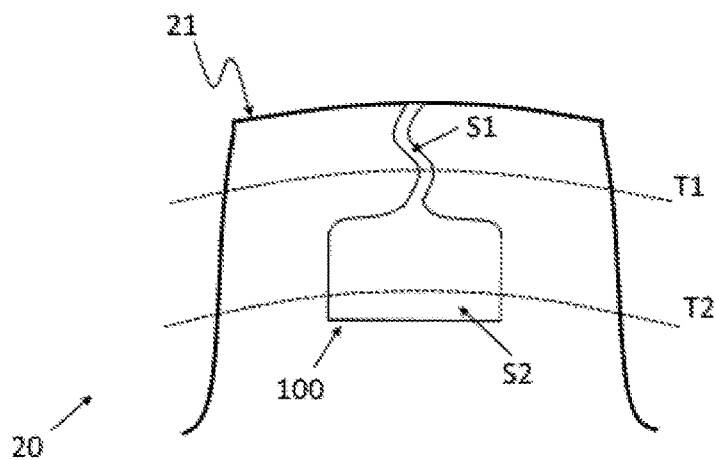
FIG. 5A shows a cross section (taken along the line OL of FIG. 2) of a tread block according to a further possible embodiment of the present disclosure.
Figure 5B:
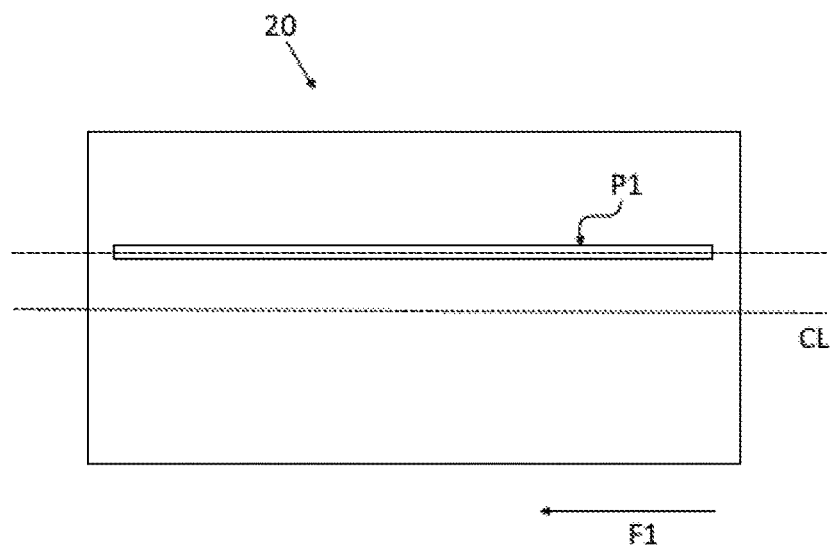
FIGS. 5B and 5C show cross sections of the block of FIG. 5A, corresponding to the surfaces T1, T2.
Figure 5C:
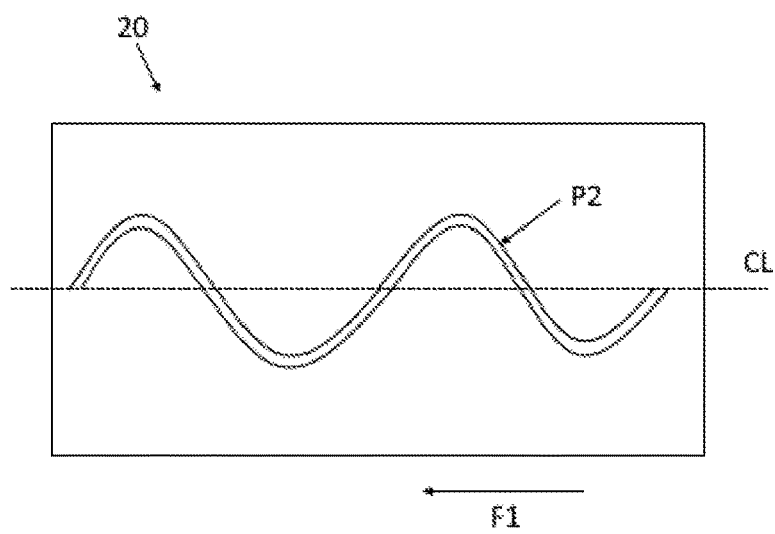

This is better seen in FIGS. 4A, 4B, 4C, which show a possible embodiment, and in FIGS. 5A, 5B, 5C, which show a further possible embodiment.

More particularly, FIGS. 4A and 5A show cross sectional views of a block according to the present disclosure, respectively, which show possible progressions of the sipe 100 within the block. For simplicity, in FIGS. 4A and 5A a form is represented that schematically defines the sectional outline of the sipe 100 and not the exact shape thereof.

FIGS. 4B and 5B show respective sections of the block according to which we highlight an intersection profile P1 corresponding to a first surface T1 parallel to the contact surface 21, while FIGS. 4C and 5C show respective sections of the block which show a different intersection profile P2 corresponding to a second surface T2 parallel to the contact surface 21.

It is understood that, in principle, the conformation shown in the above figures for each of the two sections S1, S2 of the block 20, is not necessarily to be considered limiting. These sections may be shaped differently, provided that they fulfill the general principle described above.

Figure 6:
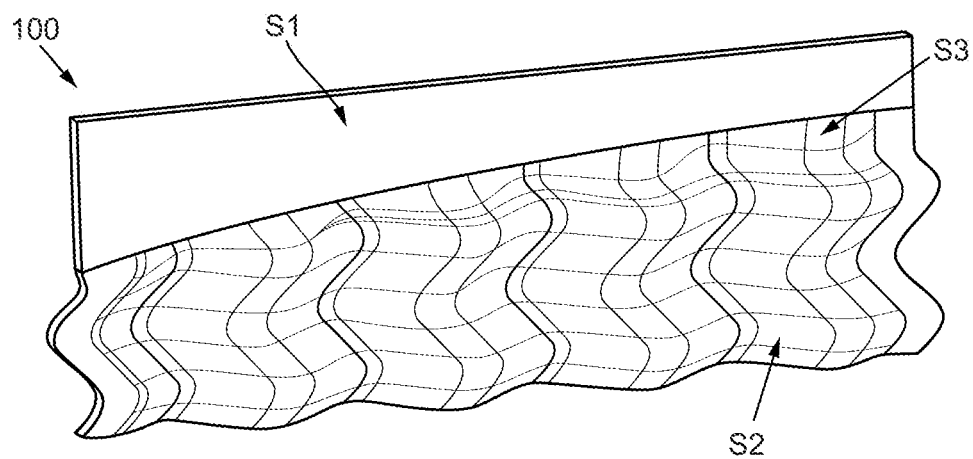
FIG. 6 is a three dimensional view of a sipe according to a still further possible embodiment of the present disclosure.

With reference to FIG. 6, this shows a sipe 100 according to a preferred embodiment of the present disclosure.

In this case, the surface section S1 has a substantially two-dimensional conformation, arranged in such a manner that a surface T1 parallel to the contact surface of the tread always intersects it along a straight line substantially parallel to the sipe extension L.

Preferably, the surface section S1 in this case has a planar conformation.

Also according to this preferred embodiment, the sipe 100 is such that a depth section S3 has a substantially two-dimensional conformation, arranged however in such a manner that a surface T2 parallel to the contact surface 21 of the tread 20 always it intersects along a curved line.

Thus, the transition section S3 advantageously implements a continuous connection of the surface section S1 with the depth section S3.

The conformation makes it possible to optimize the block 20, rendering it more pliable only at the surface portion (the one closest to being in contact with the road surface). For this reason, a surface section with a substantially planar progression is preferable. This is to the benefit of performance, essentially on wet and/or snow-covered surfaces, insofar as the conformation of the surface section S1 allows for greater opening of the block, ensuring a greater wiping effect in the wet and better entrapment of snow, respectively.

Figure 7:
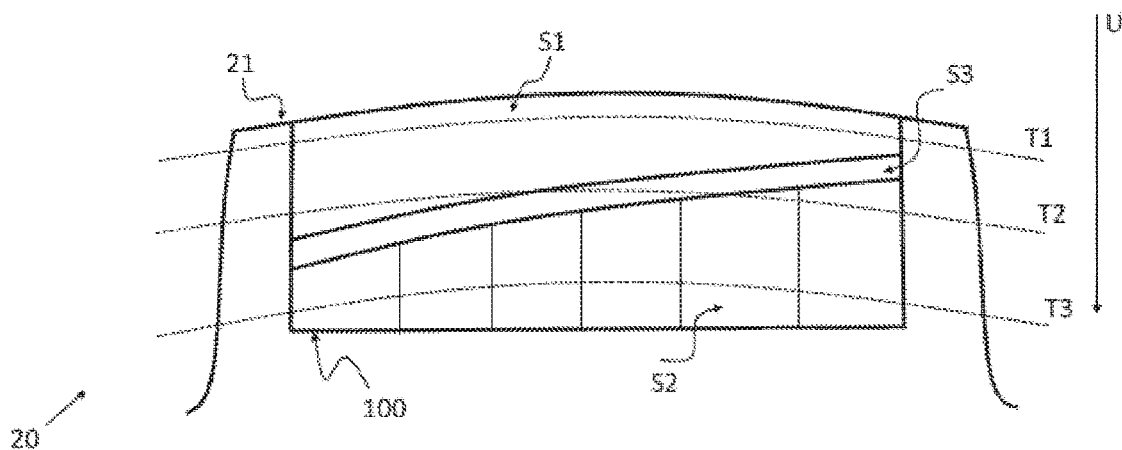
FIG. 7 is a cross sectional view along the line CL of a block according to the present disclosure.

The next FIG. 7 is a sectional view of a block 20 of a tread 10 according to the present disclosure, wherein the section lines A, B, C are traced that identify respective surfaces parallel to the contact surface 21. The section lines A, B, C are taken in such a manner as to engage the sipe 100 at different depths. In particular, the section lines A, B, C also correspond to increasing levels of tread wear.

Figure 8A:
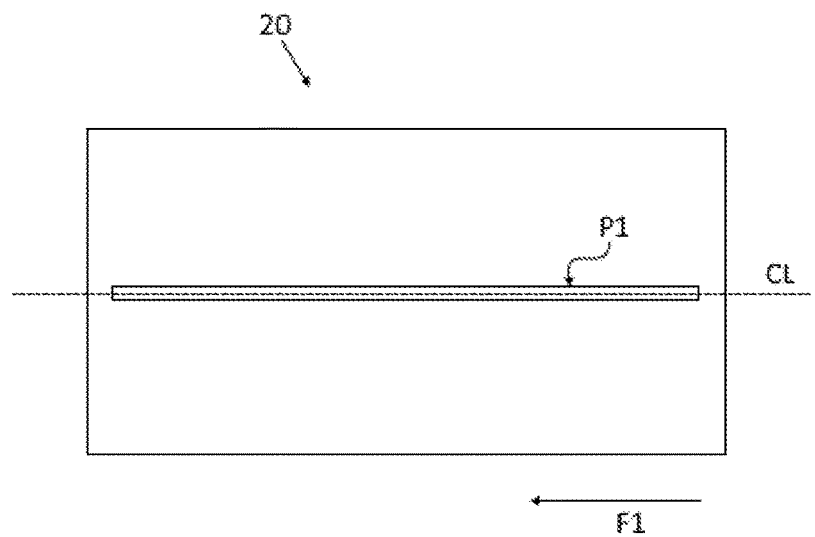
FIGS. 8A, 8B and 8C are cross section views from above of the block of FIG. 7, corresponding to respective section surfaces T1, T2, T3.
Figure 8B:
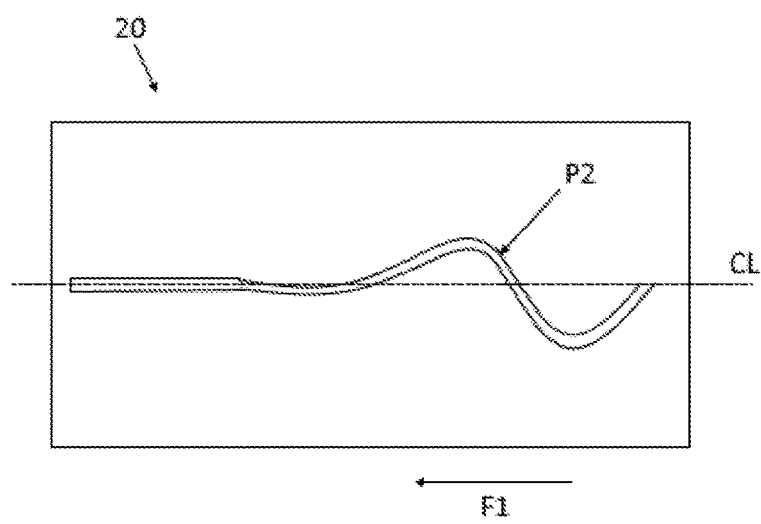
Figure 8C:
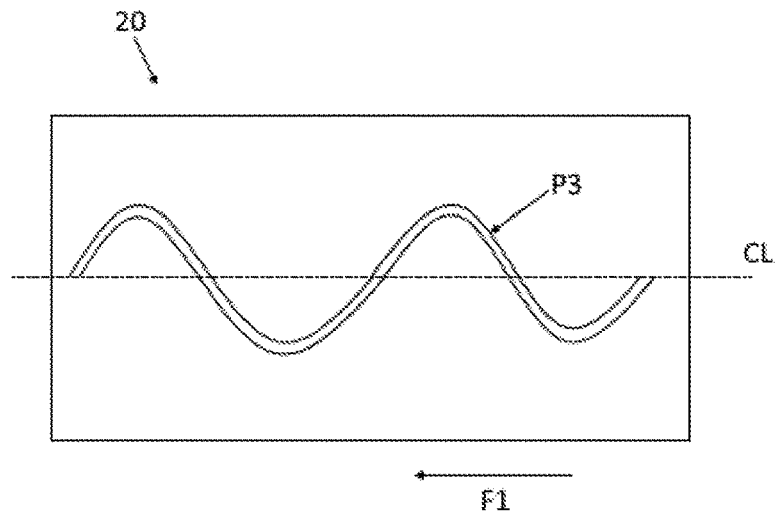

FIGS. 8A, 8B, 8C show in plan view, views of the block 20 of FIG. 7, at the section lines A, B, C, respectively.

Observing the three figures in sequence, it can be seen how for reduced wear levels (FIG. 8A), the intersection profile PA is a substantially straight line, as a function of the planar conformation of the surface section S1.

In correspondence to an intermediate wear level (FIG. 8B), the intersection profile PB begins to assume the conformation of a curved line, which terminates in a straight section, due to the fact that the section line B intersects, in the direction of the arrow F1 shown in the figure, in part the depth section S3, in part the transition section S2 and in part the surface section S1.

Finally, for deep wear levels (FIG. 8C), the intersection profile PC completely assumes a curvilinear progression, as a function of the conformation of the single depth section S3 of the sipe 100.

It is evident that the overall conformation of the sipe in all the constituent sections thereof, is such that, with increasing tread wear, the profile of the sipe continuously varies the shape thereof, starting (in this case) from a straight line, gradually modifying itself as the wear increases, until it assumes, for the entire sipe extension, a curved line conformation.

As already indicated, the specific conformations of the different sections is not particularly relevant, in the sense that the progression thereof could also be inverted with respect to what has been described, provided that at least two sections of the sipe exhibit different conformations therebetween that are such to result in a continuous modification effect as the level of wear of the tread increases.

Figure 9A:
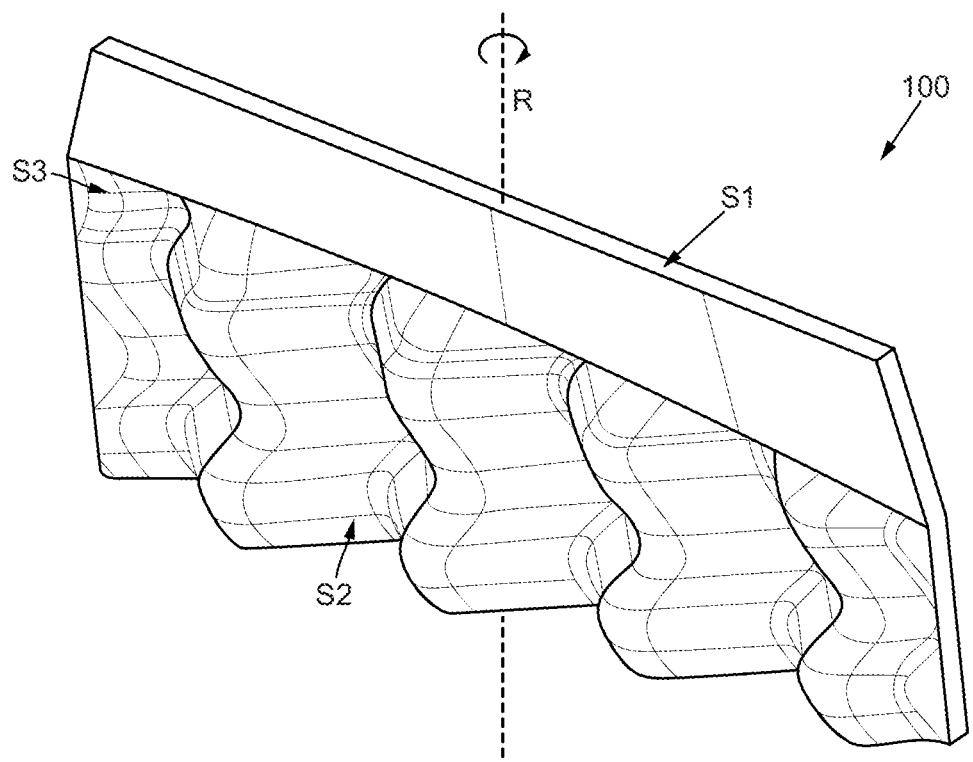
FIG. 9A is a three dimensional view of a sipe according to a still further possible embodiment of the present disclosure.
Figure 9B:
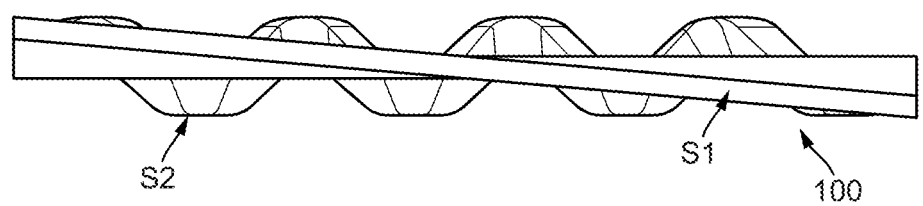
FIG. 9B is a plan view from above of the sipe of FIG. 9A.
Figure 9C:
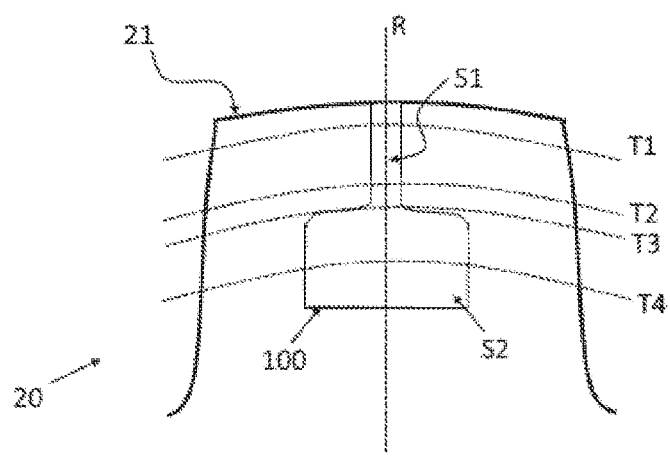
FIG. 9C is a sectional view of a block (taken along the line OL) that incorporates the sipe of FIG. 9.
Figure 10A:
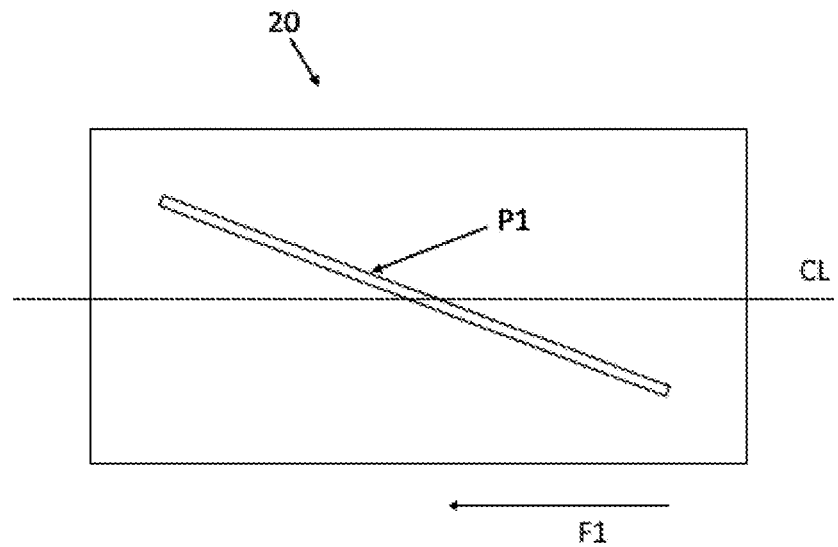
FIGS. 10A, 10B, 10C and 10D are cross sectional views from above of the block of FIG. 9C, corresponding to respective section surfaces T1, T2, T3 and T4.
Figure 10B:
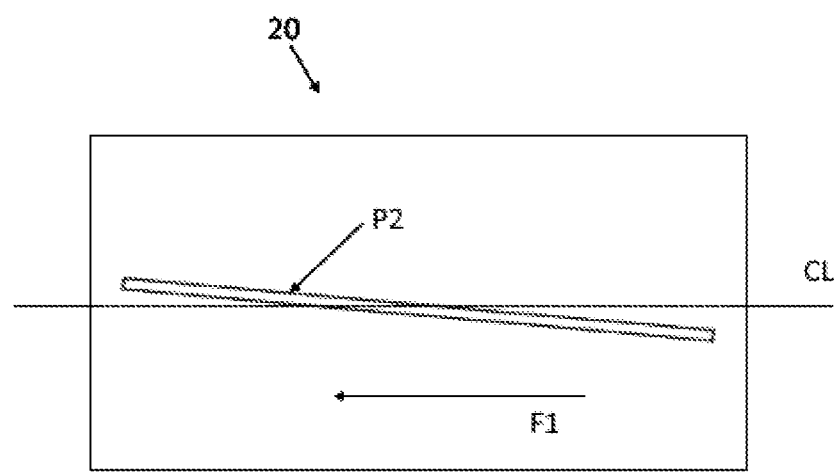
Figure 10C:
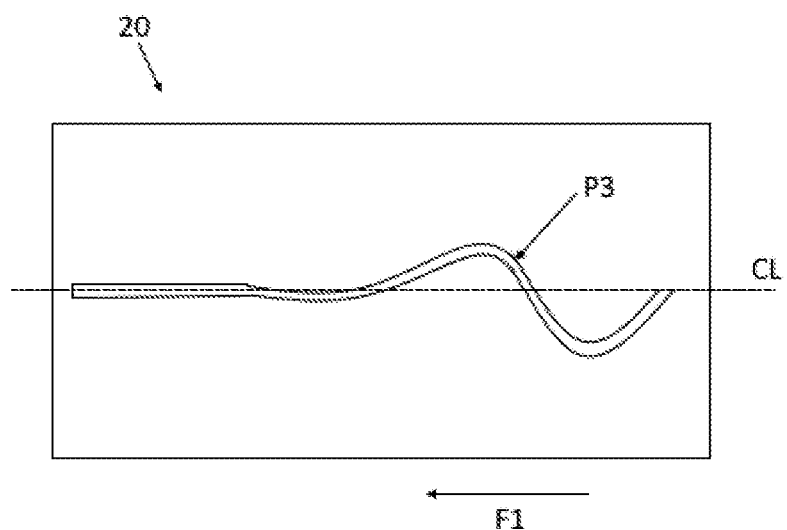
Figure 10D:
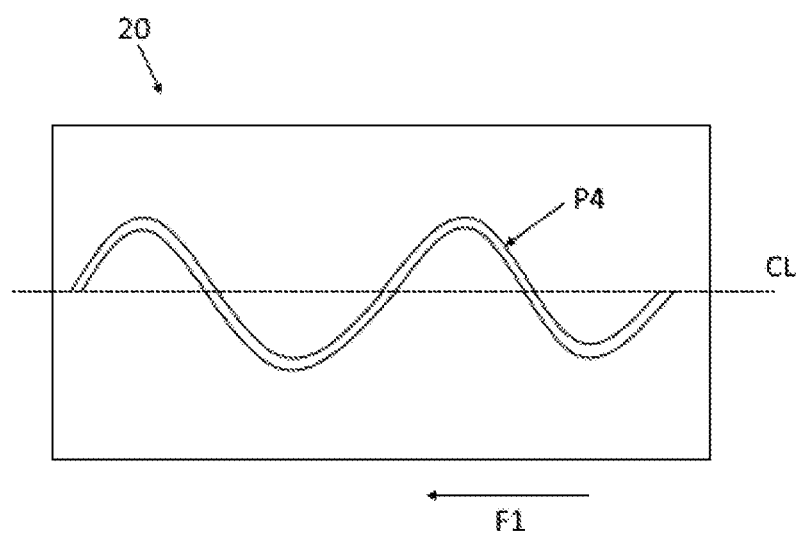

In this sense, FIGS. 9A, 9B, 9C show a still further embodiment, wherein at least one of the sipe sections, such as the cross-sectional area S1, has a substantially twisted conformation that twists around an axis R substantially orthogonal to the contact surface 21.

For simplicity, in FIG. 9C a form is represented that schematically defines the sectional outline of the sipe 100 and not the exact shape thereof.

This produces a different visual effect as the level of wear, increases, as shown in FIGS. 10A, 10B, 10C and 10D, which show respective sections of the block of FIG. 9C, taken at the surfaces T1, T2, T3 and T4. It can be seen how, with increasing wear, the intersection profile is visible as straight lines P1 and P2 that are oriented differently with respect to the longitudinal direction of the block itself until the wear is such to involve the depth section S2. At this point, the intersection profile P3 begins to modify itself by virtue of the involvement of the transition region, until it assumes a conformation P4 that is completely due to the conformation of the depth section.

It is of course to be understood that the twisted conformation may be imposed upon any of the sections of the sipe, as well as upon surface sections—as exemplified herein—and upon depth section. Further, the helical conformation is applicable, both in the case wherein the section has a substantially planar conformation, and in the case in which it has a more complex conformation.

Additionally, FIGS. 11, 11A, 11B, 11C and 11D show a still further embodiment, wherein at least one of the sipe sections, such as the cross-sectional area S1, has a conformation whereby the thickness of the sipe (corresponding to that section) is not constant throughout the depth of the section itself.

For example, in the figures a cross-sectional area S1 is shown, wherein the sipe has a thickness that increases with increasing depth in relation to the contact surface. Of course, the thickness of the sipe may vary in the opposite sense and/or nonetheless differently.

Figure 11:
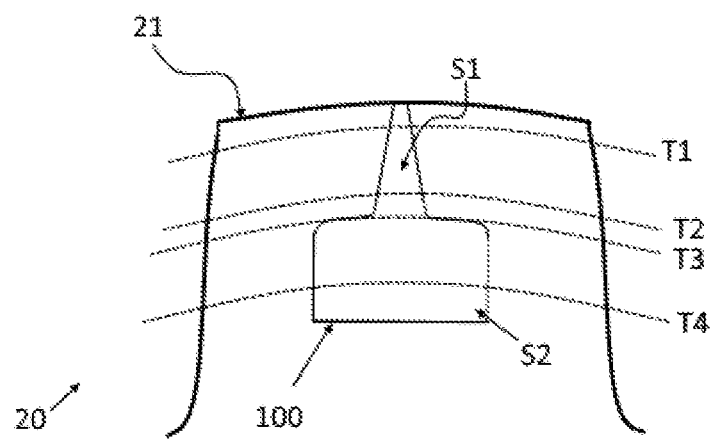
FIG. 11 is a sectional view of a block (taken along the line OL) according to a still further possible embodiment.
Figure 11A:
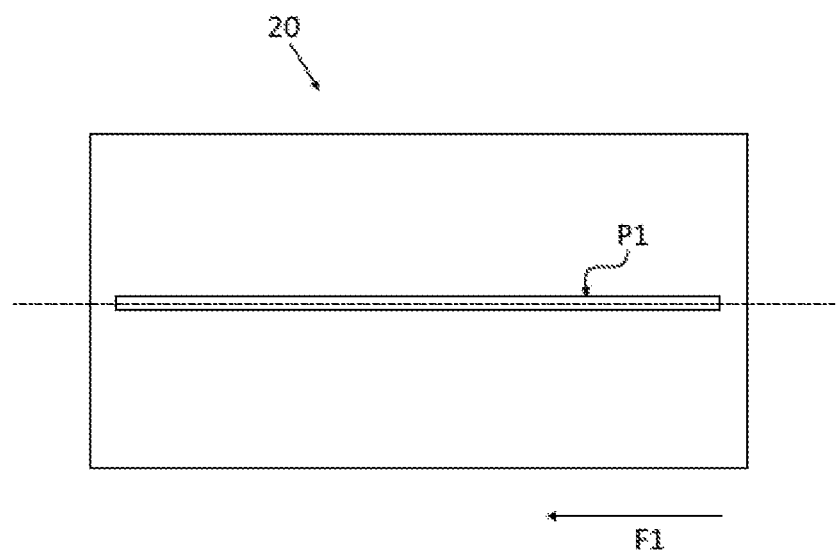
FIGS. 11A, 11B, 11C and 11D are cross sectional views from above of the block of FIG. 11, corresponding to respective section surfaces T1, T2, T3 and T4.
Figure 11B:
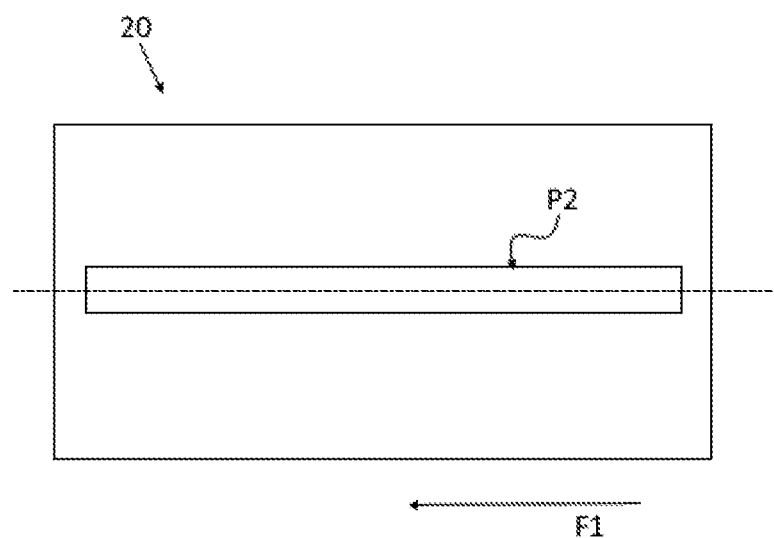
Figure 11C:
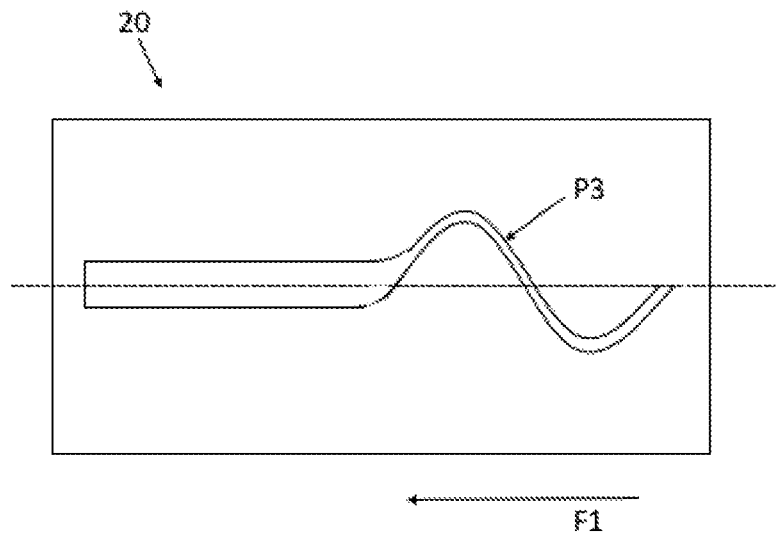
Figure 11D:
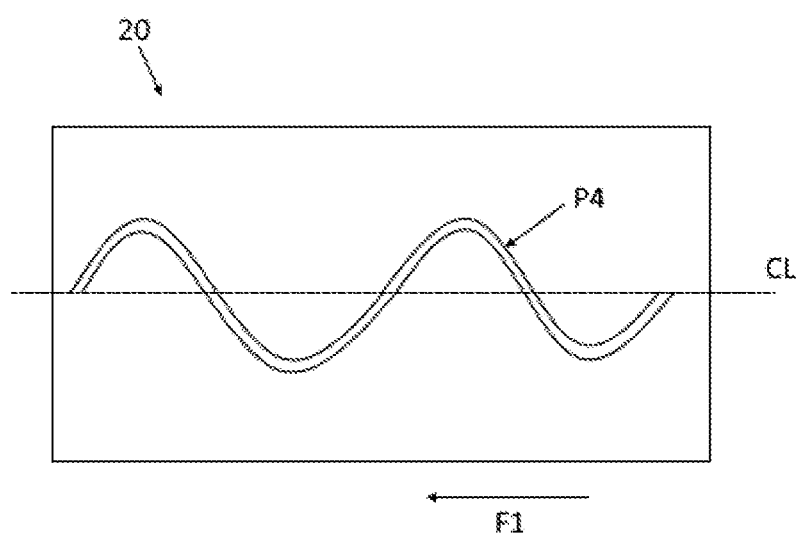

For simplicity, in FIG. 11 a form is represented that schematically defines the sectional outline of the sipe 100 and not the exact shape thereof.

Also in this case, this produces a different effect as the level of wear increases, as shown in FIGS. 11A, 11B, 11C and 11D, which show respective sections of the block of FIG. 11, taken at the surfaces T1, T2, T3 and T4. It can be seen how, with increasing wear, the intersection profile is visible as the straight lines P1 and P2 of differing thicknesses until the wear is such not to involve the depth section S2. At this point, the intersection profile P3 begins to modify itself by virtue of the involvement of the transition region, until it assumes a conformation P4 that is completely due to the conformation of the depth section.

It is of course to be understood that the variable thickness conformation may be imposed upon any of the sections of the sipe, as well as upon surface sections—as exemplified herein—and upon depth section. Further, the variable thickness conformation is applicable, both in the case wherein the section has a substantially planar conformation, and in the case wherein it has a more complex conformation.

The present disclosure has heretofore been described with reference to the preferred embodiments thereof. It is intended that each of the technical solutions implemented in the preferred embodiments described herein by way of example can advantageously be combined in different ways between them, in order to give form to other embodiments, which belong to the same inventive nucleus and that all fall within the scope of protection afforded by the claims recited hereinafter.

The invention claimed is:

1. A tread for a pneumatic tire, the tread having a plurality of tread components each having a respective contact surface, wherein at least one of the tread components comprises a sipe having a sipe extension and a sipe depth along a direction of wear substantially orthogonal to the contact surface,
  wherein the sipe has at least two sections along the direction of wear having respective differentiated conformations, such that an intersection profile between the sipe and a surface parallel to the contact surface of the tread is different for each of the at least two sections, wherein at least one section of the at least two sections has a variable depth along the sipe extension, and wherein the at least two sections include a surface section,
  wherein the at least two sections are connected by a transition section which defines a transition line between the surface section and the transition section,
  wherein the variable depth of the surface section presents a maximum depth and a minimum depth, the variable depth varying in a continuous manner between the maximum depth and the minimum depth with respect to the transition line along the sipe extension,
  wherein the surface section has a substantially twisted conformation, arranged in such a manner that a surface parallel to the contact surface of the tread always intersects the surface section along a straight line that is oriented differently with respect to a longitudinal extension line of the tread as a function of depth, and
  wherein the sipe has a sipe thickness that is constant along all of the at least two sections and the transition section.

2. The tread of claim 1, wherein the variable depth of the surface section assumes the maximum depth and the minimum depth at respective ends of the sipe extension.

3. The tread of claim 1, wherein the surface section has a substantially two-dimensional conformation, arranged in such a manner that a surface parallel to the contact surface of the tread always intersects the surface section along a straight line substantially parallel to the sipe extension.

4. The tread of claim 3, wherein the surface section has a planar conformation.

5. The tread of claim 1, wherein the at least two sections comprise a depth section which has a substantially two-dimensional conformation, arranged in such a manner that a surface parallel to the contact surface of the tread always intersects the depth section along a curved line.

6. The tread of claim 5, wherein the transition section implements a continuous connection of the surface section with the depth section.

7. The tread of claim 5, wherein the transition section has a dimension along the sipe depth that is at least one of:
   negligible compared to the surface section, or
   negligible compared to the depth section.

8. The tread of claim 1, wherein the sipe extension extends along a sipe direction substantially oriented according to a longitudinal extension line of the tread.

9. A pneumatic tire comprising the tread of claim 1.

* * * * *